Patented June 7, 1938

2,119,970

UNITED STATES PATENT OFFICE 2,119,970

NONCAKING SODIUM ACID SULPHATE

Franklin D. Smith, Webster Groves, Mo., assignor to Monsanto Chemical Company, St. Louis, Mo., a corporation of Delaware No Drawing. Application May 4, 1936, Serial No. 77,789

4 Claims. (Cl. 23—243)

The present invention relates to the treatment of deliquescent materials which, upon standing, tend to agglomerate into hard, relatively non-frangible masses and has particular relation to the treatment of ordinary sodium acid sulphate or nitre cake.

The main objects of the invention are to provide sodium acid sulphate or nitre cake in a comminuted or globular form which does not set up into a hard infrangible cake even after prolonged exposure to moisture and/or elevated temperatures; and to provide a simple, economical and efficient method of obtaining nitre cake of the above indicated characteristics. These and other objects will be apparent from consideration of the following specification and the appended claims.

Sodium acid sulphate is usually sold as pellets or globules, such as may be obtained by spraying or sprinkling the molten material downwardly through a tower or chamber under conditions assuring solidification of the droplets while they are in air; such material initially is highly soluble and easy to handle, and to pour from containers. For domestic use, as well as for commercial application, it is not entirely satisfactory because it is highly deliquescent and tends, upon exposure to moist air, to take up water and thus to set up into a hard, comparatively infrangible mass which is difficult to handle and which dissolves much less quickly in water than the granular or globular form which is preferred by the user.

For purposes of reducing this tendency of nitre cake to agglomerate, it is customary to supply the sodium acid sulphate for domestic use in cans which are usually provided with friction tops that can be pressed down tightly to form a fairly effective seal for the cans. Contact of moist air with the contents during periods of storage can thus be prevented and caking retarded. However, considerable trouble is involved in forcing the lids down sufficiently secure after partial use of the contents to assure adequate exclusion of the air from the unused material. Likewise, to open the cans the use of some pointed instrumentality, which is not always available, is required. Usually, in time, the cans and their lids become more or less encrusted and corroded so that effective sealing becomes practically impossible. As a result, even in cans, nitre cake which is initially in a globular or granular state and can readily be poured from the container and which quickly dissolves upon contact with water, sets up into such hard and infrangible state that removal requires the use of a knife or some similar instrument.

The admixture of talc, magnesia and similar pulverulent materials with the nitre cake in amounts sufficient to encase the particles with a noncaking outer layer has been suggested. Such materials tend to dust off; moreover, they are of restricted solubility.

The present invention involves the discovery that nitre cake in globular or granular form may be prevented from caking by treatment with certain relatively inexpensive materials such as ordinary hydrated borax, of the kind used domestically as a detergent, and as a water softening agent. Such materials when added to nitre cake even in amounts constituting little more than a trace, effectively retard or practically inhibit the coalescence of the individual particles constituting the mass.

In practicing the invention, ordinary globular or granular nitre cake is simply mixed by agitation by means of any convenient equipment with the finely powdered borax until comparatively uniform distribution is obtained. The borax is employed conveniently as the ordinary hydrated material, having the formula:

$$Na_2B_4O_7.10H_2O.$$

Partially or completely dehydrated borax, such as intumesced borax, may also be used. Extremely small amounts of the borax are found to be quite sufficient to eliminate the tendency of the nitre cake to cake during any ordinary period of storage. In general ½ to ¾ of 1% of borax is quite sufficient. Smaller amounts than ½%, of course, will have some effect in retarding the tendency of nitre cake to set up into a solid mass. Amounts greater than ¾ of 1% may also be used; but, since such amounts are not required for most purposes, their use is not usually justifiable from the standpoint of economy.

For purposes of determining the efficiency of the borax as a noncaking agent, globular sodium acid sulphate was treated therewith in accordance with the foregoing description and was then subjected to an accelerated caking test which involved introduction of the globular nitre cake into a tight chamber where it was exposed to the action of a current of air which was 95% saturated at a temperature of 90 to 95° C. for a period of 8 hours. The humid air was then shut off and the chamber was placed upon a steam bath and heated for a further period of 16 hours. It was then left standing for purposes of determining the time required for it to set up into a cake.

Samples containing no borax, when subjected to this test were found to set up into hard masses within a period of 24 hours or less. In contradistinction, samples which had been treated with borax were found to retain their granular or globular characteristics after standing for a period of more than 3 months and apparently they could be preserved for longer periods without the usual tendency to agglomerate. Other samples of globular nitre cake which have been treated with borax have been subjected to an ordinary exposure test involving simple exposure in the open air and have been found to retain practically their original globular characteristics after months of exposure. Similar samples of untreated nitre cake when so exposed set up to hard, relatively infrangible cakes within a week.

Borax may be replaced by boric acid or sodium metaborate, as well as the various borates of such metals as potassium, calcium and magnesium.

Globular nitre cake, when treated with an anti-caking agent, such as borax, may be left in imperfectly sealed containers for long periods of time without any appreciable tendency to set up into cakes. Accordingly, care in the closing of the containers after use is not required.

The anti-caking agent is required in such small amounts that it does not appreciably affect the properties of the nitre cake other than to retard or inhibit the tendency of the individual globes to coalesce into a solid cake. The amount of anti-caking agent required is so small that it does not appreciably increase the cost of the material. Furthermore, it does not dust out to any appreciable degree. The anti-caking agents are of great value in the preservation of nitre cake intended for domestic use. However, they may also be employed to advantage for the preservation of the granular characteristics of nitre cake which is to be stored or shipped in large bulks for various commercial uses, such as the manufacture of glass, treatment of sewage and the like.

Although only the preferred forms of the invention have been described, it will be apparent to those skilled in the art that numerous modifications may be made therein without departure from the spirit of the invention or the scope of the appended claims.

What I claim is:

1. The method of preventing the agglomeration of globular nitre cake comprising the admixture therewith of a borate in an amount sufficient substantially to inhibit coalescence of the individual particles.

2. A composition of matter comprising nitre cake in globular form characterized in that the said globular product is admixed with a borate in an amount sufficient substantially to inhibit coalescence of the individual particles.

3. A composition of matter comprising nitre cake in globular form characterized in that the said globular product is admixed with hydrated borax in an amount sufficient substantially to inhibit coalescence of the individual particles.

4. A composition of matter comprising nitre cake in globular form characterized in that the said globular product is admixed with a material selected from a class consisting of boric acid and salts thereof in an amount sufficient substantially to inhibit coalescence of the individual particles.

FRANKLIN D. SMITH.